Jan. 11, 1955    R. D. IRWIN    2,699,095
CONTROL APPARATUS FOR PULP REFINERS
Filed Nov. 10, 1953
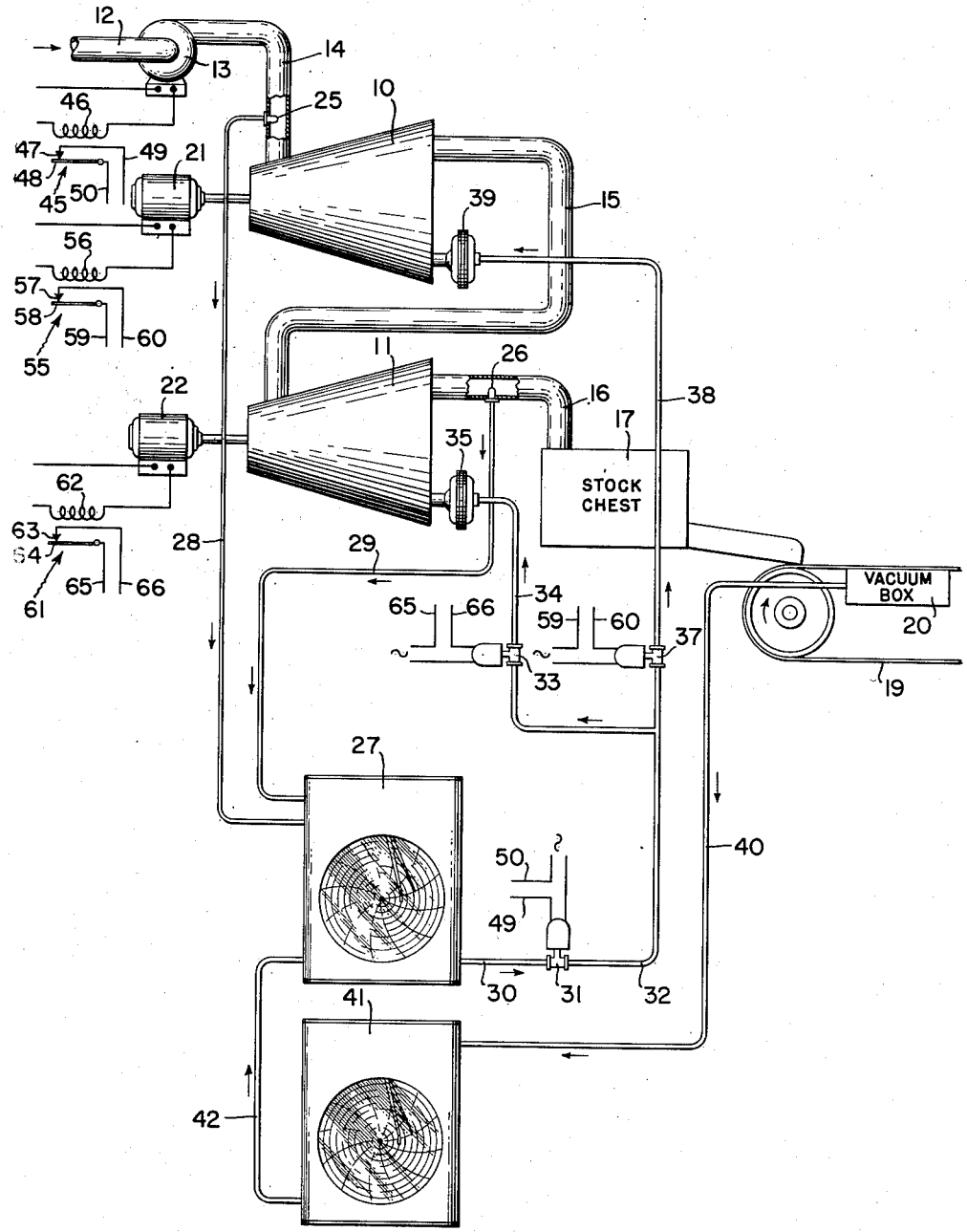
INVENTOR.
RUSSEL D. IRWIN
BY *Arthur H. Swanson*
ATTORNEY.

United States Patent Office 2,699,095
Patented Jan. 11, 1955

2,699,095

CONTROL APPARATUS FOR PULP REFINERS

Russel D. Irwin, Oreland, Pa., assignor to Minneapolis-Honeywell Regulator Company, Minneapolis, Minn., a corporation of Delaware Application November 10, 1953, Serial No. 391,298

12 Claims. (Cl. 92—27)

The general object of the present invention is to provide a new and improved apparatus for controlling the operation of a material grinder or refiner. More specifically, the present invention is concerned with controlling a grinding operation in accordance with the amount of work done by the grinder as measured by a condition change of the material which is passed through the grinder.

The control of the quality of the end product of a grinding operation may be accomplished by controlling in accordance with the amount of work done on the material by the grinder. It has been found that the most direct way of observing the amount of work done is to observe the temperature rise of the material passing through the grinder. Thus, in the control of the fineness of the grind of paper pulp, the temperature of the wood fibers going through the jordans or refiners may be compared with the temperature of the fibers as they leave the jordan or refiners. The resultant temperature difference may be used to reset the grinding operation to a desired point which will insure the best end product while enhancing the life of the grinder by maintaining its grinding operation in its most effective area.

In addition to control of a grinding operation by the work done on the product which is refined, it is sometimes desirable to modify the grinding operations within certain limits in accordance with the character of the end product. Thus, in the paper making industry, the work done by the jordans or refiners may be modified by the freeness of the final product. This latter type of an arrangement produces an even more uniform end product than is attainable by other known present day controls.

It is therefore a more specific object of the present invention, to provide a control apparatus for automatically controlling a grinding operation in accordance with the temperature rise of the refined product as it passes through the grinder.

A still further object of the present invention is to provide an automatic controller for a grinding operation with the grinding being controlled by the temperature rise of the refined product as it passes through the grinder and resetting the control in accordance with a further condition of the end product of the grinder.

Another more specific object of the present invention, is to provide a paper pulp refiner control apparatus for adjusting a pulp refiner in accordance with a temperature signal indicative of work done and resetting the temperature signal in accordance with the freeness of the final pulp.

Still another object of the present invention is to provide a new and improved control apparatus for controlling a grinding apparatus in accordance with the temperature rise of the material refined by the grinder and arranging the control apparatus so that the grinding operation will be ineffective in the event of failure in the material supply or grinder drive motors associated with the overall control system.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Referring to the single figure, there is shown a control apparatus for a grinder system which is particularly adapted for use in the paper industry. While the explanation that follows will be in connection with a paper pulp refining apparatus, it is to be understood that any type grinding operation can be controlled in accordance with the principles which are herein set forth.

The grinding operation is accomplished by a pair of jordans 10 and 11. These jordans are of conventional structure and are adapted to grind or refine products which are passed therethrough. The paper pulp solution which is to be refined is supplied by way of an input conduit 12 and pump 13 to a conduit 14 on the inlet of the jordan 10. The output of the jordan 10 is by way of a conduit 15 which passes through the input of the jordan 11, the latter of which has an output conduit 16. The output conduit 16 may be connected in any desired manner into a conventional paper making apparatus. As shown, the conduit 16 leads into a stock chest 17 and the output of the stock chest 17 passes to a continuously moving wire 19. A vacuum box 20 is mounted immediately under the wire on its upper surface. The vacuum box is effective to withdraw some of the fluid from the paper pulp solution which is applied to the wire 19 from the stock chest 17.

The apparatus thus far described is fairly conventional in paper making machinery and it will be readily apparent that other apparatus configurations may be used in the apparatus as set forth. A conventional electrical drive motor 21 is connected to supply the driving energy for the jordan 10 while a drive motor 22 is connected to supply the driving energy for the jordan 11.

The control apparatus associated with the refining apparatus includes a pair of temperature sensitive bulbs 25 and 26. The bulb 25 is positioned in the input conduit 14 and senses the temperature of the material to be refined at the point of entry into the jordan 10. The bulb 26 in turn senses the temperature of the material in the conduit 16 as it leaves the refining jordan 11. Both of the temperature responsive bulbs 25 and 26 are connected to the input of a differential measuring instrument 27 by way of conduits 28 and 29 respectively. The instrument 27 may well take the form of the apparatus shown in the patent to Edwin C. Burdick, No. 2,410,335, issued October 29, 1946. The instrument is effective to produce an output pressure which is proportional to the difference between the input control signals supplied by the temperature responsive devices 25 and 26. In applications where there is a small span between the temperature of the bulbs 25 and 26, it may be desirable to use resistance type bulbs connected into an appropriate electrical circuit.

The output pressure of instrument 27 is supplied by way of a conduit 30, a cut-off valve 31, a further cut-off valve 33, and a conduit 34, to a pneumatic actuator 35 which is arranged to adjust the grinding and refining operation of the jordan 11. The output pressure also passes from conduit 32 to a cut-off valve 37, and a conduit 38, to a further pneumatic actuator 39 for varying the loading of the jordan 10.

The set point of the instrument 27 is arranged to be automatically adjusted in accordance with the freeness of the paper pulp solution which is applied to the wire 19. To determine the freeness, the pressure condition within the vacuum box 20 is determined and applied by way of a conduit 40 to the input of a measuring instrument 41. The output of this instrument is a pneumatic pressure which appears in the conduit 42 and is applied to vary the set point of the instrument 27.

The cut-off valve 31 connected between the conduits 30 and 32 provides a means for cutting the control apparatus off in the event that there is a failure of the supply pump 13. The control for this cut-off valve is accomplished by a relay 45 which includes a coil 46, a contact 47, and a blade 48. When the supply pump 13 is energized by an appropriate electrical power source, the relay blade 48 will be engaged and the contact 47 will close an electrical circuit between leads 49 and 50 which control the energizing circuit of the valve 31. The safety cut-off valve 37 is controlled by a further operational sensing relay 55 which includes a relay coil 56, a contact 57, and a movable blade 58. When the relay coil 56 is energized by the current flowing to the drive motor 21, the blade 58 will be engaging contact 57 and an electrical circuit will be completed between the electrical leads 50 and 60 which are connected in the energizing circuit for the valve 37.

The energizing circuit for the safety cut-off valve 33 is controlled by safety cut-out relay 61 having a relay coil 62, a fixed contact 63, and a movable switch blade 64. When power is being supplied to the jordan drive motor 22, the relay 61 will be energized with the blade 64 engaging contact 63 to complete an energizing circuit between the leads 65 and 66 which are connected in the energizing circuit for the valve 33.

*Operation*

In considering the operation of the present apparatus, it will be noted that a paper pulp solution is flowing through the input conduit 12 and is forced by way of the pump 13 through conduit 14 into the input of the jordan or refiner 10. This refiner will serve to grind or refine the paper pulp fibers which are applied into the input and the amount of the refining will be dependent upon the setting of the grinding portions of the grinder as adjusted by the pneumatic actuator 39. As long as there is a predetermined pressure signal applied to the actuator 39, some refining operation will take place. The output of the refiner passes by way of conduit 15 to the input of the refiner 11 where the fibers are again additionally refined and these in turn are passed through the conduit 16 into the stock chest 17. From the stock chest 17 the pulp solution passes on to the wire 19 where the liquid of the solution is removed by means including the vacuum box 20. The vacuum box 20 will have a pressure therein which is proportional to the freeness of the pulp that has been applied to the wire 19 from the stock chest 17.

The amount of refining done by the jordans 10 and 11 is determined in the present apparatus by measuring the temperature difference between the inlet pulp solution temperature and the outlet pulp solution temperature as determined by the temperature responsive bulbs 25 and 26 respectively. With a predetermined temperature differential, there will be on the output of the instrument 27 a predetermined control pressure which will be applied by way of the output conduits to the pressure actuators 35 and 39 which set the refining or grinding operation of the jordans. The effect of a low temperature differential between 25 and 26 will be to cause a higher output pressure in the output of the instrument 27 which will apply an increased pressure to the actuators 35 and 39 so as to cause the respective jordans to increase their refining operation. If the temperature difference between the bulbs 25 and 26 is too high, the pressure on the output 27 will decrease so as to decrease the refining operation of the jordans 10 and 11.

By arranging the control in this manner, more accurate observation of the actual work output of the jordans is obtainable and the jordans may be adjusted to operate in their most effective range. While not shown, it will be readily apparent that any suitable means, may be incorporated for balancing the refining operation between the jordans 10 and 11. In addition, separate control for each jordan may be provided by incorporating the system shown for the two on individual jordans. Generally, however, where two jordans are being operated in series, it is possible to obtain adequate control by the apparatus shown.

As the quality of the output of the refiner is generally of importance, it is sometimes desirable to modify the controlling action of the refiners in accordance with the condition of the output product. Thus, the freeness of the paper pulp solution issuing from the stock chest 17 is important in determining the final quality of the paper to be made from the solution. A freeness measurement may serve to reset the refining operation. As shown in the drawings, the pressure condition in the vacuum box 20 is a measure of the freeness of the paper pulp as it is applied to the wire 19 and this freeness measurement is indicated by the instrument 41 which in turn produces an output controlling pressure to reset the instrument 27 in accordance with variations of freeness. In this manner, much closer control may be maintained over the final product with the apparatus operating in its most efficient manner.

For protecting the apparatus, the safety cut-out relays 31, 33, and 37 have been provided. If the supply pump 13 should become inoperative as indicated by a loss of power in the supply lines thereto, the relay 45 will become deenergized and the circuit including conductors 49 and 50 will be broken. The opening of this circuit will cause the valve 31 to be deenergized and the output pressure of the instrument 27 will no longer be applied to the pneumatic actuators 35 and 39. With the pressure removed from the actuators 35 and 39, the refining operation of the jordans 10 and 11 will be stopped and the jordans will be protected from possible damage.

Should either of the drive motors associated with the respective jordans be deenergized due to a lack of power, the associated relays 55 and 61 are effective to deenergize the respective valves 37 and 33. Thus, if one of the drive motors should become deenergized, the jordan associated therewith will have the load removed therefrom and the jordan will not be damaged. By providing this protecting apparatus, maximum protection for the refiners is attainable.

While, in accordance with the provisions of the statutes, there has been illustrated and described the best forms of the embodiments of the invention known, it will be apparent to those skilled in the art that changes may be made in the forms of the apparatus without departing from the spirit of the invention as set forth in the appended claims and that in some cases certain features of the invention may be used to advantage without a corresponding use of other features.

Having now described my invention, what I claim as new and desire to secure by Letters Patent is:

1. A paper pulp refining apparatus comprising, a refining grinder having an input and an output with a paper pulp solution flowing therethrough, control means for varying the refining action of said refiner, an input temperature responsive means and an output temperature responsive means, and means including both of said temperature responsive means connected to control said control means for said refiner.

2. In control apparatus for a paper pulp refiner which refiner includes a grinder having an adjustable loading means therefor, the combination comprising, means arranged to be positioned to be responsive to the temperature of the input of the grinder, means arranged to be positioned to be responsive to the temperature of the paper pulp on the output of the grinder, control apparatus connected to respond to the difference in temperatures between said temperature responsive means, and means including said control apparatus arranged to control the loading means for the grinder.

3. Apparatus for controlling the grinding operation of a grinder which has an input and an output comprising, temperature responsive means responding to the temperature difference between the input and the output of the grinder, and means controlled by said temperature responsive means for adjusting the grinding operation of said grinder.

4. In apparatus for controlling a pair of series connected grinders wherein the grinding operation of said grinders is to be controlled by the work done by said grinders, the combination comprising, grinder output measuring means comprising a pair of temperature responsive elements whose output is indicative of the work done by said grinders, and means controlled by said last named means for effecting adjustment of said grinders in accordance with the temperature conditions indicated by said pair of temperature responsive means.

5. In a control apparatus for a paper pulp refiner having loading means for adjusting the refiner, the combination comprising, refiner work output measuring means comprising a pair of temperature responsive means which produce a differential temperature proportional to the work output of the refiner, means including said pair of temperature responsive means arranged to adjust the loading means for said refiner, and means responsive to the freeness of the paper pulp connected to modify the controlling action of said pair of temperature responsive means.

6. Apparatus as defined in claim 5 wherein said paper pulp freeness responsive means comprises means responsive to a pressure condition which is proportional to the freeness of the paper pulp.

7. In a paper pulp refiner which includes a pair of series connected grinders, the combination comprising, means responsive to the differential temperature between the output and input of said refiner for determining the work output of said refiner, loading means for each of said grinders of said refiner, and means including said temperature responsive means connected to control both of said loading means.

8. A control apparatus in a paper pulp refiner which refiner includes a pump for supplying paper pulp stock to the input of the refiner and a pair of grinders having separate motor means for driving the same, the combination comprising, differential temperature responsive means for measuring the work output of the refiner, a separate loading means for each of the grinders of said refiner, means including said temperature responsive means for adjusting the loading means of both of said grinders, pump operation responsive means connected to interrupt the controlling action of said differential temperature responsive means in the absence of pump operation, and grinder motor operation responsive means connected to interrupt the controlling operation of said differential temperature responsive means with respect to the associated grinder in the absence of motor operation of the associated grinder.

9. Grinder control apparatus comprising differential temperature responsive means arranged to respond to temperature conditions representative of work output of the grinder, means for variably loading the grinder connected to be controlled by said differential temperature responsive means, and means for interrupting said last named means when said grinder is inoperative.

10. Apparatus for controlling a grinder comprising, means responsive to a differential temperature condition indicative of the work output of the grinder, grinder adjusting means connected to be controlled by said temperature responsive means, and means responsive to a grinder effected condition of the output of the grinder to vary the controlling affect of said temperature responsive means.

11. Apparatus for controlling a material refiner comprising, means responsive to a condition indicative of the work output of the refiner, refiner adjusting means adapted to be controlled by said first named means, and means responsive to the refined conditions of the output of said refiner for varying the affect of said first named means.

12. Apparatus for controlling a refiner for paper pulp comprising, means for measuring the load on the pulp refiner, refiner adjusting means adapted to be controlled by said load measuring means, and means responsive to the freeness of the pulp for varying the action of said refiner adjusting means.

No references cited.